United States Patent
Griswold et al.

(10) Patent No.: US 9,621,970 B2
(45) Date of Patent: Apr. 11, 2017

(54) OLT MAC MODULE FOR EFFICIENTLY PROCESSING OAM FRAMES

(71) Applicant: Avago Technologies General IP (Singapore) Pte. Ltd., Irvine, CA (US)

(72) Inventors: Mark Griswold, Fremont, CA (US); Lawrence Drew Davis, Petaluma, CA (US); Mitchell McGee, Santa Rosa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 704 days.

(21) Appl. No.: 13/630,425

(22) Filed: Sep. 28, 2012

(65) Prior Publication Data

US 2014/0093239 A1 Apr. 3, 2014

(51) Int. Cl.
*H04J 14/00* (2006.01)
*H04Q 11/00* (2006.01)

(52) U.S. Cl.
CPC . *H04Q 11/0067* (2013.01); *H04Q 2011/0083* (2013.01)

(58) Field of Classification Search
CPC ....... H04Q 2011/0083; H04Q 11/0066; H04Q 11/0067; H04Q 2011/009; H04J 14/00
See application file for complete search history.

(56) References Cited

U.S. PATENT DOCUMENTS

| | | | |
|---|---|---|---|
| 2003/0048801 A1* | 3/2003 | Sala et al. | 370/445 |
| 2003/0179769 A1* | 9/2003 | Shi et al. | 370/442 |
| 2004/0109688 A1* | 6/2004 | Kim et al. | 398/68 |
| 2005/0058135 A1* | 3/2005 | Sisto et al. | 370/395.2 |
| 2005/0129030 A1* | 6/2005 | Choi et al. | 370/395.53 |
| 2007/0025734 A1* | 2/2007 | Oogushi et al. | 398/71 |
| 2009/0067835 A1* | 3/2009 | Chen | H04J 3/14 398/45 |
| 2010/0104073 A1* | 4/2010 | Dwyer et al. | 379/39 |
| 2012/0263462 A1* | 10/2012 | Koren et al. | 398/45 |
| 2013/0160028 A1* | 6/2013 | Black | G06F 15/17325 719/314 |

* cited by examiner

*Primary Examiner* — Noel Beharry
*Assistant Examiner* — Ruihua Zhang
(74) *Attorney, Agent, or Firm* — Sterne, Kessler, Goldstein & Fox P.L.L.C.

(57) ABSTRACT

Embodiments of the present disclosure provide efficient solutions for detecting and transmitting heartbeat frames at an optical line terminal (OLT) of an Ethernet passive optical network (EPON). The processing burden of a host CPU is reduced by shifting some of the processing responsibilities of the host CPU to an embedded CPU. An OAM capture FIFO buffer stores frames for later processing by the embedded CPU, and fields of an OAM vector register are changed whenever a heartbeat frame is detected for an LLID. Embedded CPU polls the OAM vector at a predetermined rate sufficient to maintain link status, so heartbeat messages are not missed even when the OAM capture FIFO buffer overflows. Additionally, an OAM generation buffer efficiently creates new heartbeat messages to be sent to ONUs for each supported LLID by modifying previously transmitted OAM frames with new information specific to the LLIDs.

20 Claims, 6 Drawing Sheets

OLT MAC MODULE FOR EFFICIENTLY PROCESSING OAM FRAMES

FIELD OF THE INVENTION

This invention relates to passive optical networks (PONs) and more specifically to processing operations, administration, and maintenance (OAM) frames in PONS.

BACKGROUND

Passive optical networks (PONs), such as Ethernet PONs (EPONs), can be used to provide access and aggregation services to a large number of customers. A single optical line terminal (OLT) of a service provider can serve multiple optical network units (ONUs) of customers in an EPON. These customers and their services can each be uniquely identified by a logical link identifier (LLID). Each of these LLIDs can require independent (Operations, Administration, and Maintenance) OAM processing. For example, OAM protocols can be used to monitor activity on a link and can detect when a link is active or inactive. These protocols specify bidirectional verification of the activity of the link. For example, an ONU can transmit at least one OAM protocol data unit (PDU) per second for each LLID as a "heartbeat" frame, and the OLT can determine that the link between the ONU and the OLT is still active after it receives this PDU. Similarly, the OLT transmits one PDU per second to each ONU for every supported LLID as a heartbeat frame so that each ONU can determine that the link is still active for each LLID.

Although a transmission rate of one PDU per second is a relatively low rate per logical channel, the aggregate number across all LLIDs can require significant processing by the OLT. For example, an 8×10G EPON Media Access Control (MAC) can serve up to 16,000 LLIDs (e.g., because there are 2,000 LLIDs per ODN, and 8×10G configuration with 8 ODNs can serve 16,000 LLIDs). The number of LLIDs integrated per chip continues to increase in this market space, so an efficient method of processing OAM PDUs for a large number of LLIDs is needed. In addition, the EPON market has a significant amount of proprietary OAM formats derived from Link OAM (IEEE 802.3 clause 57), and this area continues to evolve. Therefore, what is needed is a flexible, scalable solution to the above-mentioned problems to accommodate future changes in the market.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
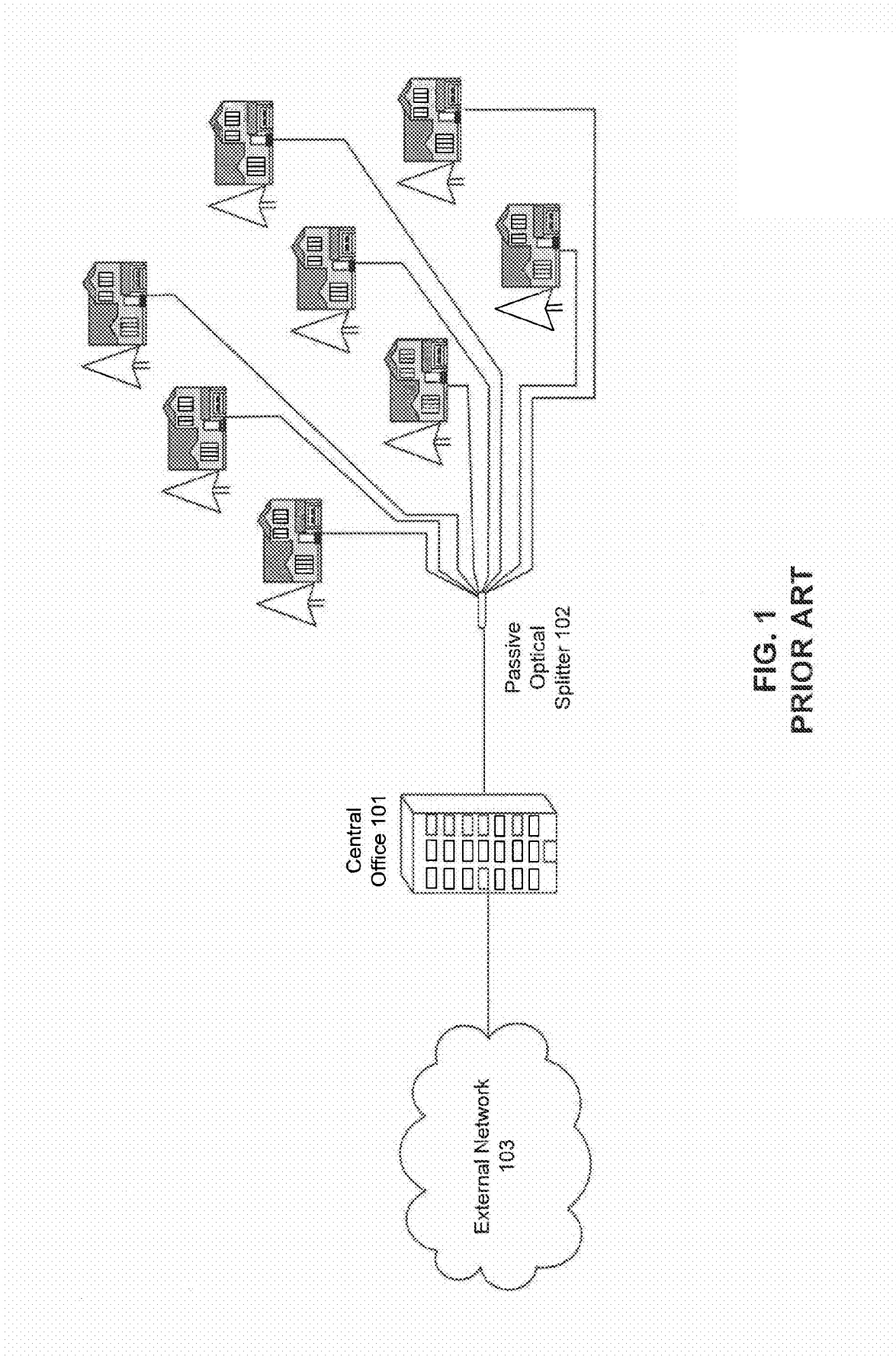
FIG. 1 illustrates a passive optical network wherein a central office and a number of subscribers are coupled together through optical fibers and a passive optical splitter.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure reduce the burden of processing OAM frames on a host CPU by shifting some of the processing responsibilities of the host CPU to an embedded CPU implemented on an OLT Media Access Control (MAC) module. An OAM capture FIFO buffer stores frames for later processing by the embedded CPU, and the embedded CPU determines which frames should be forwarded to the host CPU for additional processing. Additionally, a field in an OAM vector register is changed whenever a heartbeat frame is detected for an LLID, Embedded CPU polls the OAM vector at least once per second, so heartbeat frames are not missed even when the OAM capture FIFO buffer overflows and drops frames. Further, an OAM generation buffer efficiently creates new heartbeat frames to be sent to the ONUs for each supported LLID by modifying previously transmitted OAM frames with new information specific to the LLIDs.

2. PASSIVE OPTICAL NETWORK TOPOLOGY

A passive optical network (PON) is a point-to-multipoint network architecture comprising an optical line terminal (OLT) at the service provider and optical network units (ONUs) at subscribers for providing the subscribers broadband services. Ethernet passive optical networks (EPONs) combine the Ethernet packet framework with PON technology. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Figure 2:
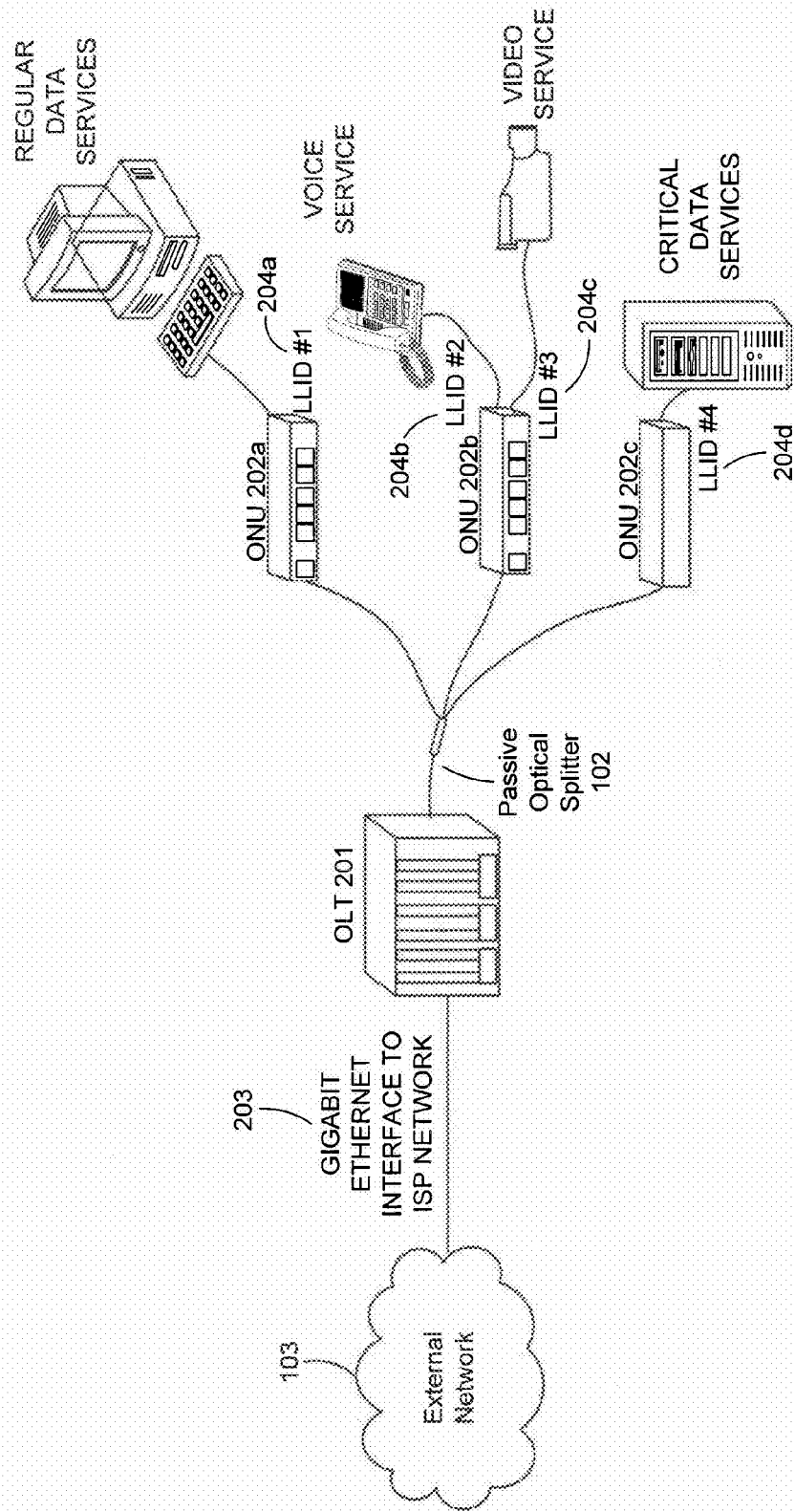
FIG. 2 illustrates a passive optical network including a single OLT and multiple ONUs.

Transmissions within an EPON are typically performed between an optical line terminal (OLT) and optical networks units (ONUs) (see FIG. 2). The OLT generally resides in a central office (e.g., central office 101 in FIG. 1) and couples the optical access network to the metro backbone, which is typically an external network belonging to an ISP or a local exchange carrier. The ONU can be located either at the curb or at an end-user location, and can provide broadband voice, data, and video services. ONUs are typically coupled to a one by N (1×N) passive optical coupler, where N is the number of ONUs, and the passive optical coupler is typically coupled to the OLT through a single optical link. This configuration can achieve significant savings in the number of fibers and amount of hardware required by EPONs.

Communications within an EPON can be divided into upstream traffic (from ONUs to OLT) and downstream traffic (from OLT to ONUs). In the upstream direction, the ONUs need to share channel capacity and resources, because there is only one link coupling the passive optical coupler with the OLT. In the downstream direction, because of the broadcast nature of the 1×N passive optical coupler, downstream data frames are broadcast by the OLT to all ONUs and are subsequently extracted by their destination ONUs based on their individual Logic Link Identifiers (LLIDs). An LLID carries physical address information for a frame and determines which ONU is allowed to extract the frame.

FIG. 1 illustrates a passive optical network (PON), wherein a central office and a number of subscribers are coupled together through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

FIG. 2 illustrates a passive optical network including a single OLT and multiple ONUs. OLT 201 resides in a central office (e.g., central office 101 in FIG. 1) and is coupled to external network 103 via interface 203. OLT 201 is coupled to ONUs 202 through optical fibers and passive optical splitter 102. As is illustrated in FIG. 2, an ONU (e.g., any of ONUs 202) can accommodate a number of networked devices, such as personal computers, telephones, video equipment, network servers, etc. One or more networked devices belonging to the same class of service are typically assigned a Logical Link ID (LLID), as defined in the IEEE 802.3 standard. LLIDs 204 can represent, for example, a customer or a service for a customer, or they can be used for some other purpose. An LLID establishes a logical link between an ONU (e.g., any of ONUs 202) and OLT (e.g., OLT 201), which accommodates specific service level agreement (SLA) requirements. In this example, LLID #1 204a is assigned to regular data services for ONU 202a, LLID #2 204b is assigned to voice services for ONU 202b, LLID #3 204c is assigned to video services for ONU 202b, and LLID #4 204d is assigned to critical data services for ONU 202c.

3. SYSTEMS

3.1 OLT MAC Module

Figure 3:
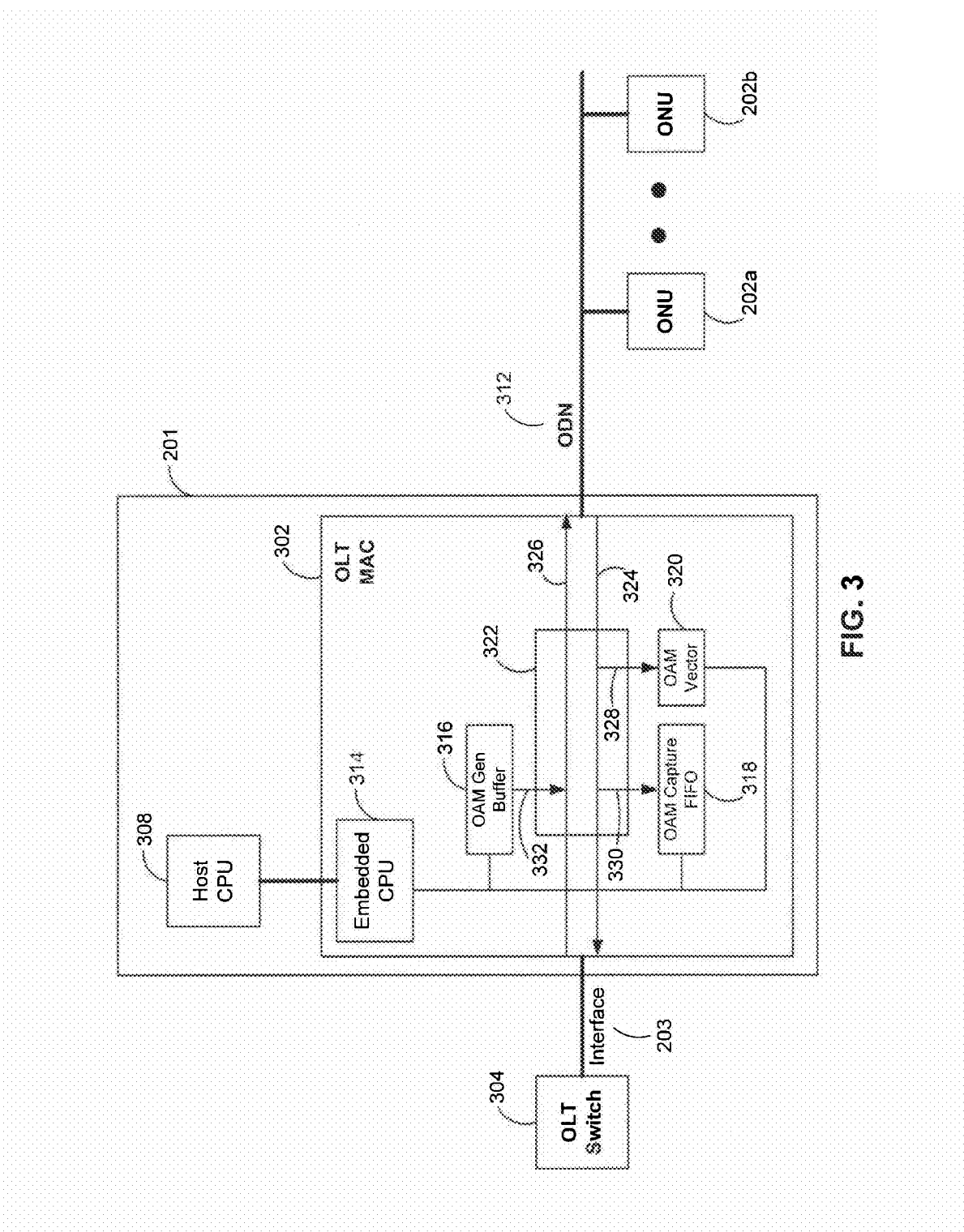
FIG. 3 is a block diagram of a system including an OLT and multiple ONUs in accordance with an embodiment.

FIG. 3 is a block diagram of a system including an OLT in communication with multiple ONUs in accordance with an embodiment of the present disclosure. In FIG. 3, OLT 201 includes an OLT Media Access Control (MAC) module 302 coupled to an OLT network switch 304 via interface 203. In an embodiment, interface 203 is a network to network interface (NNI). OLT network switch 304 is configured to route data to and from external network 103. In an embodiment, OLT MAC module 302 is implemented in hardware. For example, in an embodiment, the elements of OLT MAC module 302 are implemented on a single chip. Host CPU 308 can be implemented on the chip used to implemented OLT MAC module 302, or it can be implemented on a separate chip.

In FIG. 3, multiple ONUs (e.g., ONUs 202) are attached to a single piece of media via an optical distribution network (ODN) 312, which is also coupled to OLT MAC module 302. Information sent between ONUs 202 and external network 103 passes through a hardware data path 322 of OLT MAC module 302. Hardware data path 322 includes a downstream data path 326 and an upstream data path 324. Information traveling in a downstream direction travels from external network 103, through OLT network switch 304, interface 203, downstream data path 326 of hardware data path 322, ODN 312, and to a particular ONU (e.g., ONU 202a). Information traveling in an upstream direction travels from a particular ONU (e.g., ONU 202a), through ODN 312, upstream data path 324 of hardware data path 322, interface 203, OLT network switch 304, and to external network 103.

Each of ONUs 202 can support multiple LLIDs. For example, in FIG. 2, ONU 202b supports LLID #2 204b and LLID #3 204c. All of the LLIDs supported by each ONU 202 are sent to OLT MAC module 302 via ODN 312. OLT MAC module 302 aggregates these LLIDs and processes them. Each of these LLIDs is managed by OLT MAC module 302. For example, OLT MAC module 302 performs some basic management functions by discovering the presence of each LLID and binding it to a particular MAC address. OLT MAC module 302 can also perform additional management functions. For example, OLT MAC module 302 can oversee a key exchange between OLT 201 and a particular ONU (e.g., ONU 202a) for encryption support so that both sides know the key that should be used during a particular period of time. Additionally, for example, OLT MAC module 302 can perform power management functions by sending instructions downstream so that overall power on the network can be conserved.

3.2 Host CPU and Embedded CPU

In an embodiment, the IEEE 802.3ah, clause 57 link OAM protocol governs the delivery mechanism for providing information for management functions between an OLT and a ONU. Each of LLIDs 204 has its own independent session while management communications for a particular LLID are being sent between OLT 201 and a particular ONU (e.g., ONU 202a). The clause 57 link OAM specification requires that a constant flow of frames be maintained, at a minimum of one frame per second in each direction, to indicate whether the communications link is active or whether it has any failure status indication. This constant bidirectional flow of frames sent between OLT 201 and an ONU (e.g., ONU 202a) for a particular LLID establishes a "heartbeat" indicating the state of activity on the link.

Typically, host CPU 308 of OLT 201 is responsible for processing the OAM sublayer for each of LLIDs 204. This includes full processing of heartbeat frames, as well as all other OAM frames. Herein, in one embodiment, "heartbeat" frames are OAM frames that are continuously sent at a predetermined time intervals (e.g. 1 per second) primarily to maintain link status, and may or may not include other OAM information. The processing burden on host CPU 308 for OAM frames can be significant. As the amount of bandwidth that can be handled on any particular ODN increases from 1G to 10G, and as the amount of ONUs supported by a single OLT MAC module 302 increases, the burden of management by host CPU 308 increases dramatically. For example, OLT MAC module 302 can be responsible for handling 2000 LLIDs on a per ODN 312. Further, there may be several ODNs 312 on a single line card. Generating, processing, terminating, and handling the protocol for one frame for each LLID transmitted in each direction per second is a significant burden imposed on host CPU 308.

Additionally, both the number of supported LLIDs supported (e.g., 2,000 to 16,000 for various customers) and PON bandwidth (4G to 80G) can scale dramatically, which imposes a high processing burden on host CPU 308 to process the OAM sublayer for all the LLIDs. Additionally, the high processing burden on host CPU 308 imposes high quality requirements for host CPU 308 so that it is able to provide a quality solution for OAM. These high quality requirements lead to fewer (and more expensive) options when choosing a CPU to be implemented as host CPU 308.

Embodiments of the present disclosure alleviate the load on host CPU 308 by adding embedded CPU 314 to OLT MAC module 302 and shifting some of the processing responsibilities of host CPU 308 to embedded CPU 314. For example, host CPU 308 receives information from embedded CPU 314 regarding whether the link is alive. Host CPU 308 does not transmit "heartbeat" OAM frames for the purpose of maintaining the link, and host CPU 308 does not receive OAM frames unless they contain new information other than heartbeat frames indicating that the link is alive. Thus, in an embodiment, all of the detailed OAM frame parsing and processing can be done by embedded CPU 314, which filters frames before forwarding them to host CPU 308. Because the rules for parsing and processing link OAM frames have some complexity, reducing the processing burden on host CPU 308 relating to these link OAM frames can help to relax quality requirements for host CPU 308. Additionally, by shifting some of the processing burden from host CPU 308 to embedded CPU 314 (which can, in an embodiment, be implemented on the same chip as the other elements of OLT MAC module 302), processing algorithms can be changed over time to adapt to new customer requirements.

3.3 OAM Capture FIFO Buffer and OAM Vector Register

In an embodiment, embedded CPU 314 has hardware resources that can be accessed by hardware data path 322. OAM capture first in first out (FIFO) buffer 330 receives and stores OAM frames sent along upstream data path 324 of hardware data path 322 as information passes through hardware data path 322 so these frames can be stored for later processing by embedded CPU 314. Embedded CPU 314 can read information from a frame stored in OAM capture FIFO buffer 318, determine what kind of frame it is, and determine whether and how the frame should be handled and whether it should be passed to host CPU 308. However, OAM capture FIFO buffer 318 can overflow if, for example, a large burst of OAM frames is received at OAM capture FIFO buffer 318. For example, because OAM frames are not necessarily separated from each other in time, there is a possibility that a burst of OAM frames will be received and that all frames in this burst will not all be captured by OAM capture FIFO buffer 318. Therefore, there is a possibility that uncaptured frames will be lost and will thus not be processed by embedded CPU 314. While a FIFO buffer is described here as an example, it should be understood that any kind of buffer can be used in place of a FIFO buffer in accordance with embodiments of the present disclosure.

It is important to ensure that the heartbeat frames are not lost even when other OAM frames are lost. Because heartbeat frames are sent once per second per LLID in each direction, the majority of the OAM frames at any given point in time can be expected to be heartbeat frames. One possible solution is sizing OAM capture FIFO buffer 318 for a worst case burst scenario. However, bursts can potentially contain a very high amount of OAM frames. Thus, this solution leads to high storage capacity requirements on OAM capture FIFO buffer 318, which can be wasteful and expensive given the low average OAM frame transmission rate.

Embodiments of the present disclosure provide systems and methods for detecting heartbeat frames sent from ONUs 202 even when OAM capture FIFO buffer 318 receives a large burst of OAM frames and drops frames due to exceeding the buffer size. To consistently detect heartbeat frames, OAM vector register 320 is added to OLT MAC module 302 as a separate mechanism that is sufficient to keep the link alive even if a heartbeat frame is discarded. In an embodiment, OAM vector register 320 is a register that assigns one bit position for each supported LLID in the upstream direction. However, it should be understood that OAM vector register 320 can assign multiple bit positions to each supported LLID in accordance with embodiments of the present disclosure. (Herein the bit position(s) may be referred to as a "field") For example, in an embodiment, OAM vector register 320 can assign a multibit field to each supported LLID. In an embodiment, host CPU 308 assigns a new field in OAM vector register 320 to each new LLID it detects.

OAM vector register 320 can set a bit field assigned to a detected LLID to a value (e.g., "1") when the LLID is received, and this bit can be cleared (e.g., set to "0") after the field corresponding to the LLID is read from OAM vector register 320. For example, hardware data path 322, with access to embedded CPU 314, includes logic and/or circuits that can detect the reception of an OAM frame corresponding to a particular LLID (e.g., LLID #2 204b). When hardware data path 322 detects that LLID #2 204b was received, it can set 328 the field corresponding to LLID #2 204b in OAM vector register 320 to "1." Embedded CPU 314 reads the entry in this field of OAM vector register 320, and the field is cleared (e.g., by setting the field to "0") after embedded CPU 314 reads it. In an embodiment, hardware data path 322 detects (e.g., using logic and/or circuits included in hardware data path 322) embedded CPU 314's access to OAM vector register 320 and clears the field. Clearing the field using hardware data path 322 is very efficient and can reduce vector register 320 access time by 50%. In another embodiment, embedded CPU 314 clears the field after accessing the field. If embedded CPU 314 reads a value of "1" from this field, embedded CPU 314 can determine that an OAM frame has been received for this particular LLID since the last time a read was done. Thus, by continually reading OAM vector register 320, embedded CPU 314 can determine when a heartbeat frame for a particular LLID was received even if OAM capture FIFO buffer 318 overflows.

Embedded CPU 314 reads the OAM vector register 320 with the periodicity sufficient to maintain the link status as active. If embedded CPU 314 polls OAM vector register 320 at least once per second, embedded CPU 314 can ensure that it will detect heartbeat frames sent for each LLID at a sufficient rate to determine that the link is still active, or that it has become inactive. For example, if embedded CPU 314 reads a value of "1" from a field of OAM vector register 320 assigned to a particular LLID at a rate of at least once per second, embedded CPU 314 can determine that the link for this particular LLID is still active. If embedded CPU 314 fails to read a value of "1" from a field of OAM vector register 320 assigned to a particular LLID at a rate of at least once per second, embedded CPU 314 can determine that the requirements of the protocol have not been met and thus that the link for this particular LLID has become (or may have become) inactive. As will be apparent to those skilled in the art, various multibit fields can use different combinations logic values to mark the successful reception of a heartbeat frame.

As far as the protocol (e.g., IEEE 802.3ah, Clause 57 link OAM protocol) is concerned, receiving any OAM frame allows a recipient to assume that the status of the link is unchanged. OAM frames will not be dropped for a sustained period. Further, even if OAM frames are dropped for a sustained period, OAM frames for a particular LLID will not be dropped. Thus, a received OAM frame need not necessarily be a designated heartbeat frame to set the value corresponding to the received LLID in OAM vector register 320 to "1." An ONU (e.g., ONU 202a) will send a designated heartbeat frame if it has no other OAM frames to send during each one second period of time. Thus, from a detection standpoint, it does not matter whether the received OAM frame was sent as a designated heartbeat frame or whether the OAM frame was a "meaningful" OAM frame containing additional OAM information. Accordingly, both OAM frames designated as heartbeat frames and OAM frames containing other OAM information can function as heartbeat frames to keep the link active.

3.4 OAM Generation Buffer

Embedded CPU 314 is also responsible for generating heartbeat frames to be sent to ONUs 202. For example, embedded CPU 314 generates heartbeat frames by creating OAM frames for each LLID at least once per second and by transmitting these OAM frames to ODN 312. Once host CPU 308 notifies embedded CPU 314 that an LLID exists, embedded CPU 314 can maintain the heartbeat by constantly generating heartbeat frames for the LLID at the required rate.

Embedded CPU 314 has hardware resources that can be accessed by hardware data path 322. OAM generation buffer 316 can use these hardware resources to create new heartbeat frames for each LLID. For example, OAM generation buffer 316 supports random-access writes to minimize the burden of constructing OAM heartbeat frames on embedded CPU 314. Heartbeat frames corresponding to one LLID are not very different from heartbeat frames corresponding to another LLID (e.g., many of the fields of these frames are the same). Thus, when a heartbeat frame is sent, OAM generation buffer 316 can use at least a piece of this previously sent heartbeat frame as a template for a subsequent heartbeat frame. To generate the new heartbeat frame, embedded CPU 314 only has to fill in a few additional fields and mark the modified heartbeat frame as available to be sent out 332 to ODN 312.

Modifying fields of a previously sent OAM frame provides a much more efficient solution than creating new OAM frames for each heartbeat frame. Because heartbeat frames are very similar from LLID to LLID, modifying previous OAM frames leads to a much lighter processing burden. Because of the very large number of heartbeat frames that need to be generated (e.g., at least one heartbeat frame per second per LLID), this processing efficiency is magnified as the number of supported LLIDs increases.

4. METHODS

4.1 Filtering Received Frames Using an Embedded CPU

Figure 4:
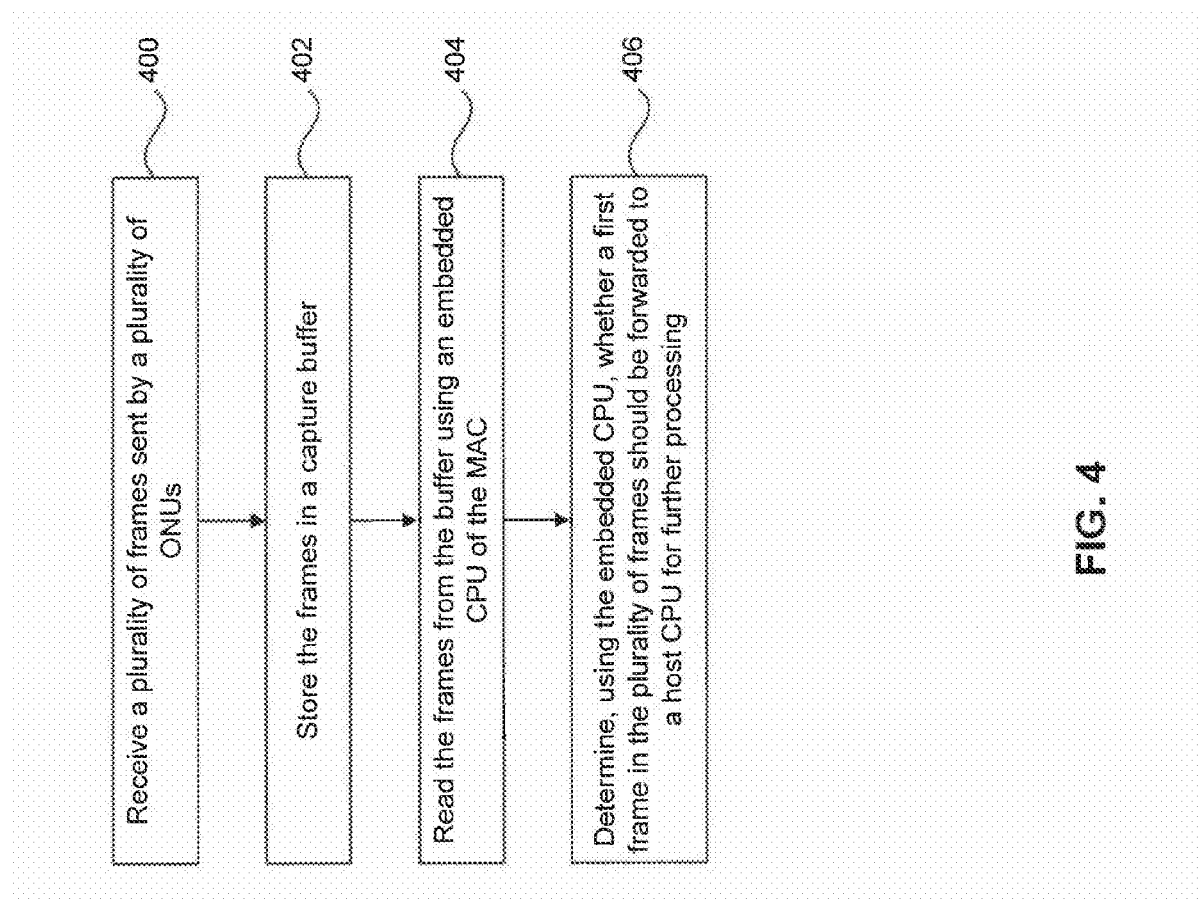
FIG. 4 is a flowchart of a method for filtering received frames at an embedded CPU of an OLT MAC module in accordance with an embodiment of the present disclosure.

FIG. 4 is a flowchart of a method for filtering received frames using an embedded CPU of an OLT MAC module in accordance with an embodiment of the present disclosure. In step 400, a plurality of frames sent by a plurality of ONUs are received. For example, hardware data path 322 receives a plurality of OAM frames from ONUs 202. In step 402, the frames are stored in a capture buffer. For example, OAM capture FIFO buffer 318 stores the frames for a later processing by embedded CPU 314. In step 404, the frames are read from the buffer using an embedded CPU of the MAC. For example, embedded CPU 314 reads frames from OAM capture FIFO buffer 318. In step 406, it is determine, by the embedded CPU, whether a first frame in the plurality of frames should be forwarded to a host CPU for further processing. For example, embedded CPU 314 reads information from each frame in OAM capture FIFO buffer 318 to determine whether to forward the frames to host CPU 308. By performing some processing functions using embedded CPU 314, the processing burden on host CPU 308 is reduced.

4.2 Determining Whether a Heartbeat Frame Has Been Received for an LLID

Figure 5:
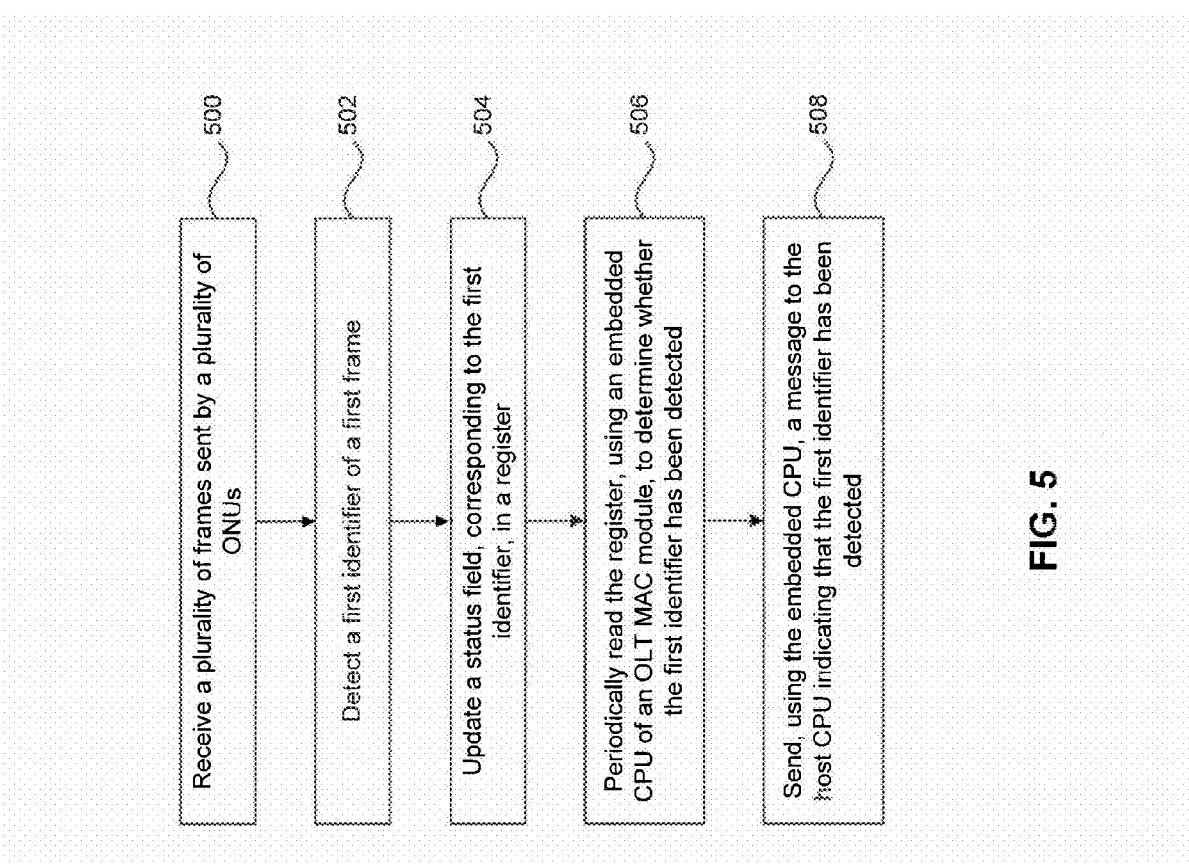
FIG. 5 is a flowchart of a method for determining whether a heartbeat frame has been received for a LLID in accordance with an embodiment of the present disclosure.

FIG. 5 is a flowchart of a method for determining whether a heartbeat frame has been received for a LLID in accordance with an embodiment of the present disclosure. In step 500, a plurality of frames sent by a plurality of ONUs are received. For example, hardware data path 322 receives a plurality of OAM frames from ONUs 202. In step 502, a first identifier of a first frame is detected. For example, hardware data path 322 can detect that a first LLID has been identified in the first OAM frame, which may be a heartbeat frame or OAM message frame. In step 504, a status field, corresponding to the first identifier, is updated in a register. For example, hardware data path 322 can update a field corresponding to the first LLID in OAM vector register 320.

In step 506, the register is periodically read, at a predetermined rate, by an embedded CPU of an OLT MAC module to determine whether the first identifier has been detected. For example, embedded CPU 314 can poll OAM vector register 320 at a rate of once per second to ensure that heartbeat frames for each LLID have been received to ensure that the link is active for each LLID. In step 508, the embedded CPU sends a message to the host CPU indicating that the first identifier for the corresponding LLID has been detected during the allotted time period. For example, when embedded CPU 314 determines that an LLID has been received after polling OAM vector register 320, it can send a message to host CPU 308 informing host CPU 308 that the link is still active for that LLID. By updating a register (e.g., OAM vector register 320) as LLIDs are detected, heartbeat frames containing LLIDs can be detected even when a burst of frames is received causing OAM capture FIFO buffer 318 to overflow.

4.3 Efficiently Generating a Heartbeat Frame for an LLID

Figure 6:
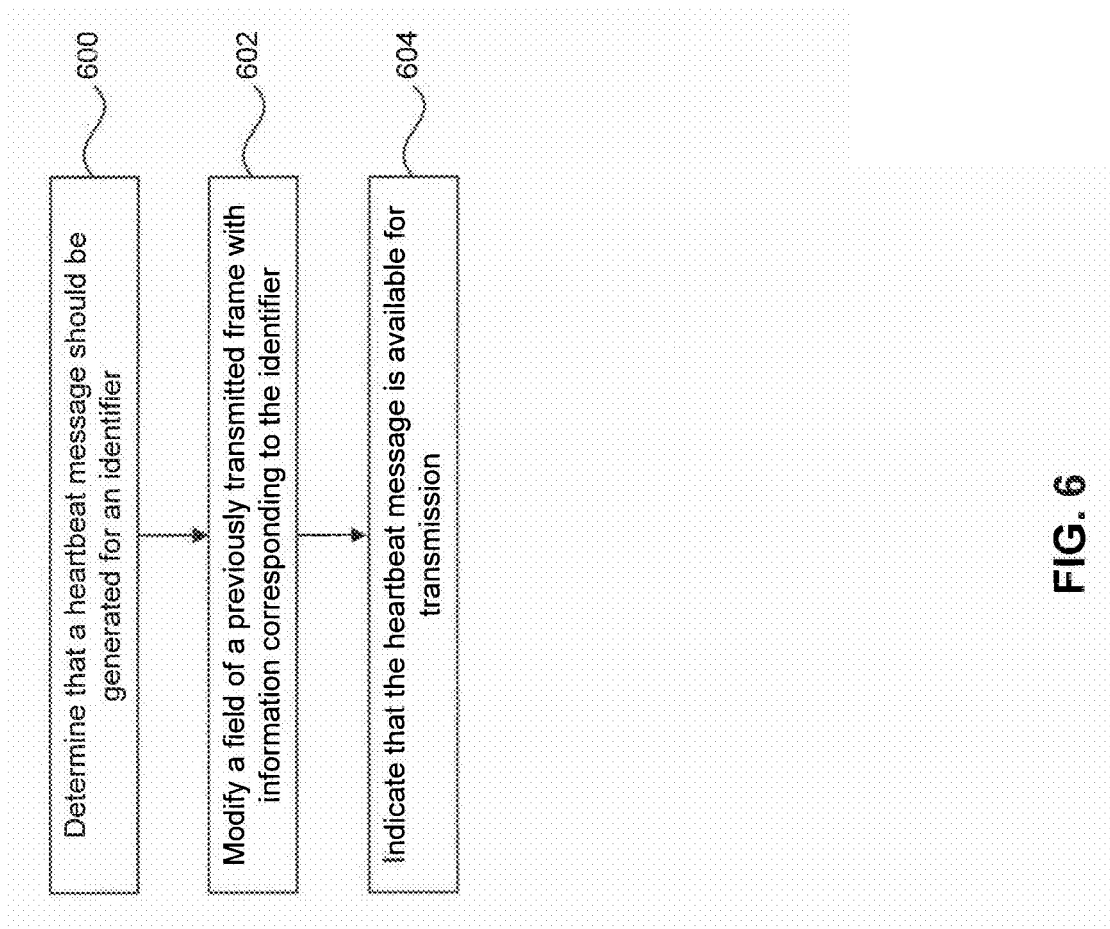
FIG. 6 is a flowchart of a method for efficiently generating a heartbeat frame for an LLID in accordance with an embodiment of the present disclosure.

FIG. 6 is a flowchart of a method for efficiently generating a heartbeat frame for an LLID in accordance with an embodiment of the present disclosure. In step 600, a determination is made that a heartbeat frame should be generated for an identifier. For example, embedded CPU 314 can determine that a heartbeat frame should be sent for each supported LLID at a rate of once per second. In step 602, a field of a previously transmitted frame is modified with information corresponding to the identifier. For example, instead of generating an entirely new frame, OAM generation buffer 316 can modify field(s) of a previously transmitted frame with information corresponding to the LLID for which the heartbeat frame is being generated.

In step 604, the heartbeat frame is indicated as being available for transmission. For example, OAM generation buffer 316 indicates that the heartbeat frame for the LLID has been generated and that it is ready to be sent along ODN 312 to the ONU (e.g., ONU 202a) corresponding to the LLID of the heartbeat frame. By modifying a previously transmitted frame instead of generating a new frame, heartbeat messages can be generated more efficiently. Further, this method allows the generation of heartbeat messages to occur using embedded CPU 314 and OAM generation buffer 316, which conserves processing resources of host CPU 308.

5. ADVANTAGES

Embodiments of the present disclosure advantageously support efficient processing of OAM frames at an OLT, even for a large number of LLIDs. Solutions provided by systems and methods according to embodiments of the present disclosure scale well as the number of supported LLIDs increases. Further, embodiments of the present disclosure provide solutions that enable algorithms to be adapted as the industry diversifies OAM frame formats, and control of the quality of OAM frame processing can be maintained independent of a customer's host CPU selection.

Embodiments of the present disclosure are primarily described in the context of EPON OLT applications, where OAM service is provided for many LLIDs. This example is described because of the large and scalable number of OAM links, as well as the proprietary and changing nature of OAM PDU formats. However, it should be understood that embodiments of the present disclosure can apply to other applications. Embodiments of the present disclosure can be used in other applications requiring a large number of OAM links integrated into a single product. For example, embodiments of the present disclosure can be applied to a variety of PONs, such as ATM PONs (APONs), broadband PONs (BPONs), gigabit PONs (GPONs), and wavelength division multiplexing (WDM) PONs.

6. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The representative signal processing functions described herein can be implemented in hardware, software, or some combination thereof. For instance, the signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, and further the invention should be defined only in accordance with the following claims and their equivalents.

What is claimed is:

1. An optical line terminal (OLT) in communication with a plurality of optical network units (ONUs) over an optical distribution network (ODN), wherein the OLT comprises:
   a host central processing unit (CPU); and
   an OLT media access control (MAC) module coupled to the host CPU, wherein the OLT MAC module comprises:
      an operations, administration, and maintenance (OAM) vector register including a plurality of fields, wherein the plurality of fields correspond to a respective plurality of logical link identifiers (LLIDs),
      a hardware data path coupled to the OAM vector register, wherein the hardware data path includes logic and/or circuits configured to:
         receive a plurality of frames from the plurality of ONUs,
         detect a first OAM frame in the plurality of frames,
         detect a first LLID in the first OAM frame, and
         update a status field, corresponding to the first LLID, in the OAM vector register, and
      an embedded CPU coupled to the OAM vector register and the host CPU, wherein the embedded CPU is configured to both periodically read and periodically clear the status field in the OAM vector register at a rate equal to a predetermined allotted interval of time to periodically determine whether an incoming heartbeat frame corresponding to the first LLID has been detected within a period of time sufficient to maintain an active link status with one or more of the plurality of ONUs.

2. The OLT of claim 1, wherein the embedded CPU is further configured to periodically send a message to the host CPU indicating that the first LLID has been detected.

3. The OLT of claim 1, wherein the rate is sufficient to maintain the active link status with the one or more of the plurality of ONUs.

4. The OLT of claim 1, wherein the logic and/or circuits are further configured to clear the OAM vector register after the embedded CPU reads the OAM vector register.

5. The OLT of claim 1, further comprising:
   a capture buffer coupled to the hardware data path and the embedded CPU, wherein the capture buffer is configured to store frames received by the hardware data path, and wherein the embedded CPU is further configured to:
      read a stored frame from the capture buffer, and
      determine whether the stored frame should be forwarded to the host CPU.

6. The OLT of claim 1, wherein the host CPU is configured to:
   determine when a second LLID has been received; and
   assign a second field in the OAM vector register that corresponds to the second LLID.

7. The OLT of claim 1, further comprising:
   a generation buffer coupled to the hardware data path, wherein the generation buffer is configured to periodically generate a heartbeat OAM frame containing the first LLID, and
   indicate that the heartbeat OAM frame is available for transmission to the ODN.

8. The OLT of claim 7, wherein the generation buffer is configured to generate the heartbeat OAM frame by modifying a field of a previously transmitted OAM frame.

9. A media access control (MAC) module of an optical line terminal (OLT), wherein the MAC module comprises:
   a register including a plurality of fields, wherein the plurality of fields correspond to a respective plurality of identifiers;
   a hardware data path coupled to the register, wherein the hardware data path includes logic and/or circuits configured to:
      detect a first frame in a plurality of received frames,
      detect a first identifier in the first frame, and
      update a status field, corresponding to the first identifier, in the register; and
   an embedded central processing unit (CPU) coupled to the register, wherein the embedded CPU is configured to both periodically read and periodically clear the status field in the register at a rate equal to a predetermined allotted interval of time to periodically determine whether an incoming heartbeat frame corresponding to the first identifier has been received.

10. The MAC module of claim 9, further comprising:
    a capture buffer coupled to the hardware data path and the embedded CPU, wherein the capture buffer is configured to store frames received by the hardware data path, and wherein the embedded CPU is further configured to:
       read a stored frame from the capture buffer, and
       determine whether the stored frame should be forwarded to a host CPU.

11. The MAC module of claim 9, further comprising:
    a generation buffer coupled to the hardware data path, wherein the generation buffer is configured to periodically generate an outgoing heartbeat frame containing the first identifier, and
    indicate that the outgoing heartbeat frame is available for transmission.

12. The MAC module of claim 11, wherein the generation buffer is configured to generate the outgoing heartbeat message by modifying a field of a previously transmitted frame.

13. A method comprising:
    receiving, at a media access control (MAC) module of an optical line terminal (OLT), a plurality of frames sent by a plurality of optical network units (ONUs);

storing the frames in a capture buffer;

reading, using an embedded central processing unit (CPU) of the MAC module, the plurality of frames from the capture buffer to detect a first identifier in the plurality of frames;

updating, using the embedded CPU, a status field stored in a register upon detection of the first identifier;

periodically reading and periodically clearing, using the embedded CPU, the status field stored in the register at a rate equal to a predetermined allotted interval of time to determine whether the first identifier has been detected, the rate sufficient to maintain an active link status with one or more of the plurality of ONUs;

sending, using the embedded CPU, a message to the host CPU indicating the first identifier has been detected based on the periodic reading of the status field; and determining, using the embedded CPU, whether a first frame in the plurality of frames should be forwarded to a host CPU for further processing.

14. The method of claim 13, wherein the first frame is a first operations, administration, and maintenance (OAM) frame, and wherein the first identifier is a first logical link identifier (LLID).

15. The method of claim 13, wherein the clearing the register occurs after the reading the register.

16. The method of claim 13, further comprising:
determining when a second identifier has been detected; and
assigning a second field in the register that corresponds to the second identifier.

17. The method of claim 13, further comprising:
periodically generating a heartbeat frame containing the first identifier; and
indicating that the heartbeat frame is available for transmission.

18. The method of claim 17, wherein periodically generating the heartbeat frame comprises modifying a field of a previously transmitted frame.

19. The OLT of claim 7, wherein the generation buffer is configured to periodically generate the heartbeat OAM frame at a rate sufficient to maintain the active link status with the one or more of the plurality of ONUs.

20. The MAC module of claim 9, wherein the generation buffer is configured to periodically generate the outgoing heartbeat OAM frame at a rate sufficient to maintain the active link status with an optical network unit (ONU) corresponding to the first identifier.

* * * * *